US007095828B1

(12) United States Patent
Elliot et al.

(10) Patent No.: US 7,095,828 B1
(45) Date of Patent: Aug. 22, 2006

(54) DISTRIBUTED NETWORK APPLICATIONS PLATFORM ARCHITECTURE

(75) Inventors: Kathleen G. Elliot, Chester Springs, PA (US); Charles M. Bartholomew, King of Prussia, PA (US); Noreddine Bouzi, Conflans Sainte Honorine (FR)

(73) Assignee: Unisys Corporation, Blue Bell, PA (US)

( * ) Notice: Subject to any disclaimer, the term of this patent is extended or adjusted under 35 U.S.C. 154(b) by 1067 days.

(21) Appl. No.: 09/636,666

(22) Filed: Aug. 11, 2000

(51) Int. Cl.
*H04M 11/06* (2006.01)
*H04L 12/58* (2006.01)
*H04L 12/28* (2006.01)

(52) U.S. Cl. ............... 379/88.18; 455/412.1; 370/406

(58) Field of Classification Search ............. 379/88.17, 379/88.18, 88.26; 370/252
See application file for complete search history.

(56) References Cited

U.S. PATENT DOCUMENTS

| 4,688,212 A | 8/1987 | MacGinitie et al. | 370/85 |
|---|---|---|---|
| 5,029,199 A | 7/1991 | Jones et al. | 379/89 |
| 5,133,004 A | 7/1992 | Heileman, Jr. et al. | 379/67 |
| 5,138,710 A | 8/1992 | Kruesi et al. | 395/575 |
| 5,301,226 A | 4/1994 | Olson et al. | 379/67 |
| 5,323,450 A | 6/1994 | Goldhagen et al. | 379/100 |
| 5,384,829 A | 1/1995 | Heileman, Jr. et al. | 379/67 |
| 5,394,460 A | 2/1995 | Olson et al. | 379/67 |
| 5,513,314 A | 4/1996 | Kandasamy et al. | 395/182.04 |
| 5,557,668 A | 9/1996 | Brady | 379/212 |
| 5,572,709 A | 11/1996 | Fowler et al. | 395/500 |

(Continued)

FOREIGN PATENT DOCUMENTS

EP 0 567 294 A2 10/1993

(Continued)

OTHER PUBLICATIONS

Copy of International Search Report dated Mar. 4, 2002.

*Primary Examiner*—Gerald Gauthier
(74) *Attorney, Agent, or Firm*—Lise A. Rode; Mark T. Starr; Woodcock Washburn

(57) ABSTRACT

A system and methods that allow local access of data residing and processed on remote messaging system computers is provided. In an illustrative implementation, a plurality of messaging systems having host computers coupled to network interface units (NIUs) act as messaging system nodes (MS Nodes). The NIUs of each of the MS Nodes are interconnected to form a wide area network (WAN) such that data may be freely communicated between the MS Nodes. An exemplary messaging system architecture comprises a host computer interconnected to a NW that, itself, is interconnected to telephone networks and to external computer networks. NIUs support a number of interfaces that allow the communication of data between the NIU and the host, and between the NIU and the external telephone and computer networks. In the distributed messaging system, a call originating from a local MS Node requesting data that resides on a remote messaging system may be transferred to the remote MS Node that has the requested data. The call is processed such that a local NIU accepts the call and communicates the call to a local host. The local host processes the call and determines that the data being requested resides on a remote host. The call is then passed back to the local NIU and transferred to the appropriate NIU using the WAN for processing by the appropriate remote host having the requested data.

16 Claims, 11 Drawing Sheets

U.S. PATENT DOCUMENTS

| | | |
|---|---|---|
| 5,592,611 A | 1/1997 | Midgely et al. ........ 395/182.02 |
| 5,608,865 A | 3/1997 | Midgely et al. ............. 395/180 |
| 5,613,108 A | 3/1997 | Morikawa ................... 393/616 |
| 5,623,538 A | 4/1997 | Petty ........................... 379/67 |
| 5,633,999 A | 5/1997 | Clowes et al. ......... 395/182.04 |
| 5,659,599 A | 8/1997 | Arumainayagam et al. ... 379/89 |
| 5,675,723 A | 10/1997 | Ekrot et al. ............ 395/182.02 |
| 5,678,042 A | 10/1997 | Pisello et al. ................ 395/610 |
| 5,680,551 A | 10/1997 | Martino, II ............ 395/200.15 |
| 5,689,706 A | 11/1997 | Rao et al. .................... 395/617 |
| 5,696,895 A | 12/1997 | Hemphill et al. ...... 395/182.02 |
| 5,724,347 A | 3/1998 | Bell et al. .................... 370/377 |
| 5,724,418 A | 3/1998 | Brady ........................ 379/212 |
| 5,732,214 A | 3/1998 | Subrahmanyam ...... 395/200.12 |
| 5,740,231 A | 4/1998 | Cohn et al. .................... 379/89 |
| 5,974,449 A | 10/1999 | Chang et al. ............... 709/206 |
| 6,134,221 A * | 10/2000 | Stewart et al. ............... 370/252 |
| 6,285,745 B1 * | 9/2001 | Bartholomew et al. .. 379/88.17 |
| 6,317,484 B1 * | 11/2001 | McAllister ................ 379/88.02 |
| 6,396,908 B1 * | 5/2002 | O'Donovan et al. ..... 379/88.18 |
| 6,477,172 B1 * | 11/2002 | Burger et al. ................ 370/406 |
| 6,650,737 B1 * | 11/2003 | Finnigan .................. 379/88.02 |

FOREIGN PATENT DOCUMENTS

| | | |
|---|---|---|
| EP | 0 760 573 A3 | 3/1997 |
| EP | 0 843 453 A2 | 5/1998 |
| EP | 0 913 982 A2 | 5/1999 |
| EP | 0 843 453 A3 | 5/2001 |
| EP | 0 913 982 A3 | 11/2001 |
| WO | WO 97/12469 | 3/1997 |

* cited by examiner

DISTRIBUTED NETWORK APPLICATIONS PLATFORM ARCHITECTURE

FIELD OF THE INVENTION

The present invention relates generally to data communication in messaging systems and, more particularly, to messaging systems having distributed host computers allowing for local access to data residing and processed on remote host computers.

BACKGROUND OF THE INVENTION

Messaging systems that provide voice, fax and/or e-mail messaging capabilities are well known. One example of such a messaging system is the Network Applications Platform commercially available from UNISYS Corporation ("the NAP system"). The NAP system is a configuration of hardware and software that provides data and voice processing capabilities through applications running on an enterprise server. The NAP system provides the interface between these applications, called network applications, and a telephone network. A voice mail application is an example of a network application that runs on the NAP platform. The voice mail application determines how calls to the messaging system are handled, what prompts are played to callers, and which features are available. Presently, the NAP is implemented on selected UNISYS A Series and ClearPath HMP NX computer systems running the MCP operating system. Further details of the structure and function of the NAP are provided in the following U.S. patents and pending applications, all of which are hereby incorporated by reference in their entireties:

U.S. Pat. No. 5,133,004, Jul. 21, 1992, "Digital Computer Platform for Supporting Telephone Network Applications";

U.S. Pat. No. 5,138,710, Aug. 11, 1992, "Apparatus and Method for Providing Recoverability in Mass Storage Data Base Systems Without Audit Trail Mechanisms";

U.S. Pat. No. 5,384,829, Jan. 24, 1995, "Digital Computer Platform for Supporting Telephone Network Applications";

U.S. Pat. No. 5,323,450, Jun. 21, 1994, "Telephone Network Applications Platform for Supporting Facsimile Applications";

U.S. Pat. No. 5,394,606, Feb. 20, 1996, "Multi-Lingual Prompt Management System for a Network Applications Platform";

U.S. Pat. No. 6,058,166, May 2, 2000, "Enhanced Multi-Lingual Prompt Management in a Voice Messaging System With Support for Speech Recognition";

U.S. patent application Ser. No. 08/964,744, filed Nov. 5, 1997, "Methods and Apparatus for Providing External Access to Executable Call Flows of a Network Application";

U.S. patent application Ser. No. 08/987,571, filed Dec. 11, 1997, "Multiple Language Electronic Mail Notification of Received Voice and/or Fax Messages";

U.S. patent application Ser. No. 09/451,077, filed Nov. 30, 1999, entitled "Method and Apparatus for Preventing Hung Calls During Protocol Violations in a Voice Messaging System";

U.S. patent application Ser. No. 09/307,014, filed May 7, 1999, "Inter-system Call Transfer"; and U.S. patent application Ser. No. 09/161,214, filed Sep. 25, 1998, "Multiple Node Messaging System Wherein Nodes Have Shared Access To Message Stores Of Other Nodes".

Network applications running on the NAP can provide enhanced services for telephone networks, such as Call Answer, Call Forward, Voice Store and Forward, Voice Mail, Bank By Phone, Emergency Number Facilities, Directory Assistance, Operator Assistance, Call Screening, Automatic Wake-up Services, and the like.

Messaging systems like the Unisys NAP are used to provide large-scale messaging services (supporting large numbers of subscribers). As such a messaging system may employ multiple NAP hosts that are geographically distributed to best suit processing demands. These hosts may be generally placed in cities to best accommodate total subscriber needs. Each NAP host typically serves the demand placed on it by its local network. However, network operators may seek to communicate between disparate NAP systems. For example, a first NAP system may be responsible for storing a subscriber's voice mailbox for his/her mobile phone, wherein the first NAP system is located in a first city. A second NAP system, located in a second geographically disparate city, may be responsible for storing the same subscriber's landline voice mailbox. A network operator operating the first and second NAP systems may wish to consolidate these voice mailboxes through communications between NAP hosts in a manner that appears to the subscriber as if the subscriber has a single voice mailbox for all of his/her phones. However, at present, the ability of one NAP host to communicate with another NAP host is limited. Hence, there is a need for a system and methods that allow for the communication of data among dispersed NAP systems. By having a distributed NAP environment, a travelling subscriber may be afforded the ability to access his/her data and/or services (e.g. Call Answer, Call Forward, Voice Store and Forward, Voice Mail, Bank By Phone, Emergency Number Facilities, Directory Assistance, Operator Assistance, Call Screening, Automatic Wake-up Services, and the like) by dialing a local number associated with the nearest NAP host. Currently, a travelling subscriber is relegated to calling the host computer on which his/her data and/or service actually resided. If the host computer is considerably remote to the subscriber, the subscriber may incur considerable calling expenses.

Further, messaging system operators may desire to consolidate messaging services between their fixed-wire and wireless messaging systems. By consolidating these services, messaging system operators may be able to offer single point of access to their subscribers for these services. For example, a messaging system operator may want to offer a consolidated voice mail box to a subscriber to consolidate voice mail between the subscriber's fixed-wire and wireless telephones. As such, a subscriber would no longer be relegated to maintain a voicemail box for his/her fixed-wire phone and another voicemail box for his/her wireless phone. Rather, the subscriber would have a consolidated voice mail box that would store messages for both of his/her fixed-wire telephone and wireless telephone. From a system standpoint, however, these services may be located in disparate messaging systems on different NAP platforms. As such, these NAP systems would be required to cooperate to efficiently share and process required data. Current NAP systems, however, are unable to efficiently realize this contemplated consolidation scheme.

From the foregoing it may be appreciated that there exists a need for a distributed network applications platform (NAP) that allows local access to data residing on remote host computers to realize a number of advantages that currently escape messaging systems.

SUMMARY OF THE INVENTION

The present invention is directed to a distributed messaging system capability in which a set of geographically distributed messaging system nodes can work together to provide a distributed message processing solution. In an illustrative implementation, the messaging system may comprise a network applications platform (NAP) system. In this illustration, remote NAP nodes may be loosely coupled together via a Wide Area Network (WAN). The WAN may be realized through the communication of data between embedded services processors (ESP) found on the local and remote NAP nodes. The ESPs may maintain IP interfaces that allow the communication of data between NAP nodes over IP networks. Generally, each NAP node interfaces to a local telephone network via a network interface unit (NIU). The NIU serves as the interface between the local telephone network and the local NAP node. Preferably, the ESPs over which NAP nodes may communicate in accordance with the distributed architecture of the present invention, reside in the NIUs of the respective NAP nodes. According to the present invention, a call received by a local NIU of a local NAP node can be transferred to the NIU of a remote NAP node via the IP network connecting the ESP of the local NIU to the ESP of the remote NIU.

Message distribution may be achieved by assigning specific mailboxes to applications residing on specific hosts. Addressing Services (i.e. a host service employed in the routing of messages) may identify host ownership for messages. As incoming calls arrive within a NIU, the NIU may pass the request to its local host. If a call received by a local host cannot process it, either the application or the NAP platform may direct the call to the appropriate host. Furthermore, calls may be transferred from host to host via inter-NIU communication. Either the NAP platform or the application may have the knowledge to select the correct destination host for any incoming call.

In the described implementation, the NIU may be a Unisys Telephony Services Platform (TSP). The TSP may cooperate with other TSPs over a WAN by using the Internet protocol (IP) communication protocol. IP communication may be realized by employing Embedded Service Processors (ESPs) having IP interfaces that reside in and cooperate with the TSP.

BRIEF DESCRIPTION OF THE DRAWINGS

A presently preferred implementation of a distributed processing messaging system in accordance with the present invention is further described with reference to the accompanying drawings in which.

DETAILED DESCRIPTION OF PREFERRED EMBODIMENTS

Figure 1:
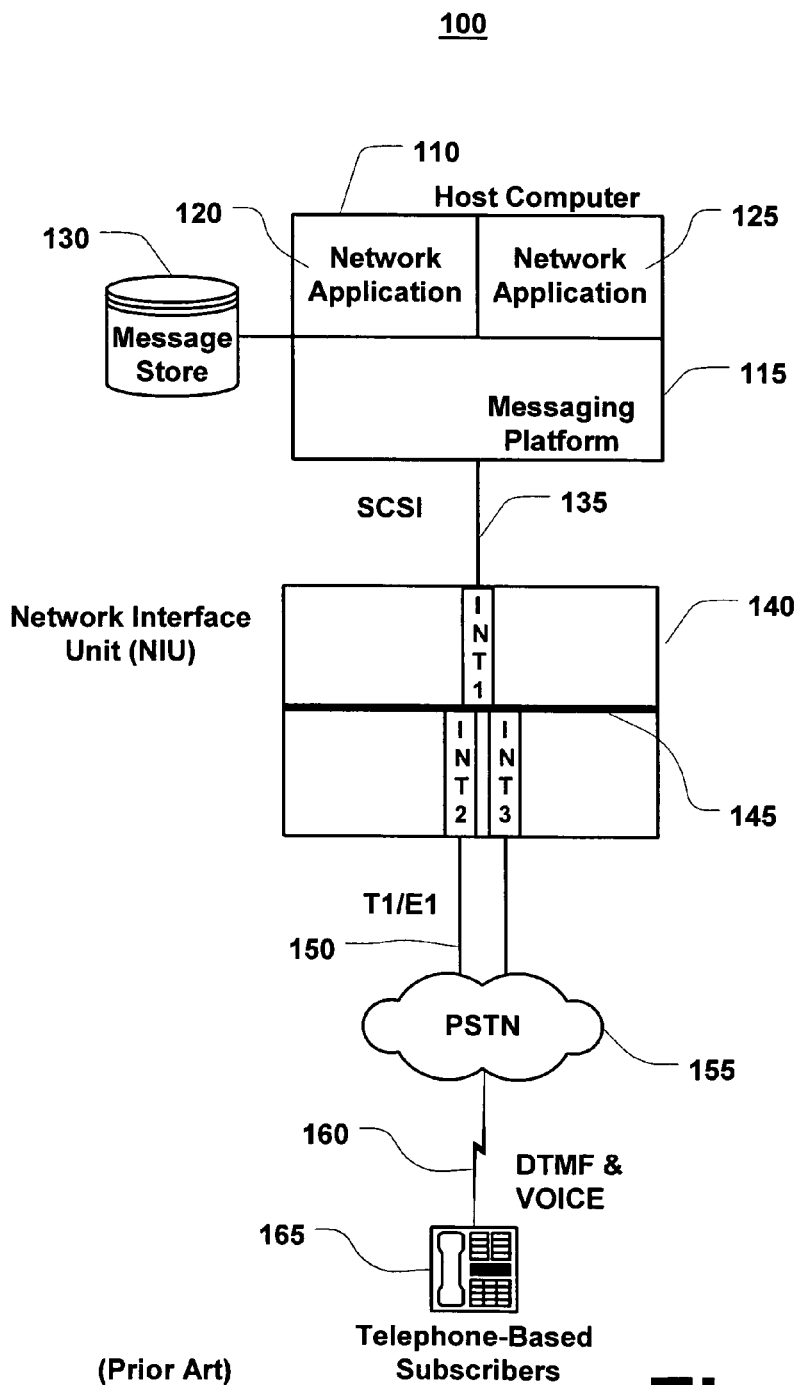
FIG. 1 is a system diagram of a prior art messaging system running a messaging platform that support messaging applications and message stores.

Messaging Systems Overview:

The present invention is directed to a distributed NAP platform capability in which a set of geographically distributed NAP nodes can work together to provide a distributed message processing solution. The remote NAP nodes may be loosely coupled together via a Wide Area Network (WAN). The WAN may be realized through the communication of data between embedded services processors (ESP) found on the local and remote NAP nodes. The ESPs may maintain IP interfaces that allow the communication of data between NAP nodes over IP networks. Specifically, each NAP node interfaces to a local telephone network via a network interface unit (NIU). The NIU serves as the interface between the local telephone network and the local NAP node. Preferably, the ESPs over which NAP nodes may communicate in accordance with the distributed architecture of the present invention, reside in the NIUs of the respective NAP nodes. A call received by a local NIU of a local NAP node can be transferred to the NIU of a remote NAP node via the IP network connecting the ESP of the local NIU to the ESP of the remote NIU. The distributed architecture allows messages serviced by NIUs associated with a specific telephone network to be processed by any host in the distributed NAP platform. By using the Embedded Service Processors to process IP communications between the various NAP nodes, data may be communicated in an efficient and controlled manner. This architecture allows a more robust implementation of services across a distributed NAP network.

Message distribution can be achieved by assigning specific mailboxes to applications residing on specific hosts. Addressing Services (i.e. a host service employed in the routing of messages) may identify host ownership for messages. As incoming calls arrive within a NIU, the NIU will pass the request to its local host. If a call received by a local host cannot process it, either the application or the NAP platform may direct the call to the appropriate host. Calls may be transferred from host to host via inter-NIU communication. Either the NAP platform or the application may have the knowledge to select the correct destination host for any incoming call. Further, call routing may be initiated by the NAP platform if the application is not available (e.g., the target application is not configured) when a call is received by the NAP platform.

Generally, the host, or the application, is responsible for re-directing calls to remote hosts and the NIU is responsible for providing the routing services to re-direct/transfer calls to remote hosts. The NIU, through inter-NIU communication across the WAN, may route call events and associated voice data. The locally attached NIU may select a path to the remote host. The path may consist of the NIU servicing the call, a remote NIU that is attached to the remote host (known as the proxy NW) and the remote host. This path may be used to transfer all signaling and voice traffic associated with the transferred call.

An example of the processing of a call in accordance with the present invention is as follows: A call is received from the telephony network by a signaling NIU. When its local host, host A, receives the call, it may be forwarded to an application on host A. The application may then decide where the call should be handled. The application may then interface with Addressing Services to determine which host owns the call. If the call is to be transferred, host A may request the signaling NIU servicing the call to transfer it to a new destination host, host B. Accordingly, the NIU, realizing the destination host is a remote host, may forward the call to a proxy NIU locally attached to host B. Upon receipt of the call by the proxy NIU, the proxy NIU may forward the call event to host B. All subsequent signaling and voice events (including the voice data) may then be forwarded to/from the remote host via the selected paths over the WAN. Accordingly, the distributed NAP capability allows local access of data residing on remote host computers.

In one embodiment, described more fully hereinafter, the methods and apparatus of the present invention may be implemented as part of a messaging system having a plurality of host computers comprising a WAN for the processing and communication of data. Although the depicted embodiment provides a messaging system having an NIU with an ESP in a particular configuration, those skilled in the art will appreciate that the inventive concepts described herein extend to computing systems having similar architectures deployed with computing hardware having various configurations.

Messaging System Architecture:

FIG. 1 shows a system diagram of prior art messaging system 100. As shown, messaging system 100 comprises host computer 110, network interface unit (NIU) 140, public switched telephone network 155, and telephone based subscribers 165. Host computer 110 comprises messaging platform 115 capable of operating network applications 120 and 125, respectively, and cooperates with message store 130. Network applications 120 and 125 may employ messaging platform 115 to receive data from message store 130 for processing. As shown, NIU 140 may comprise a plurality of interfaces, interface 1 (INT1), interface 2 (INT2), and interface 3 (INT3). INT1, INT2, and INT3 may cooperate with each other over bus 145 to communicate and process data. In the implementation shown, host computer 110 may be electronically coupled to communicate data using NIU 140 through a small computer serial interface (SCSI) 135. Comparatively, NIU 140 may be electronically coupled to communicate data using T1/E1 interface 150.

In operation, telephone based subscribers 165 may request processing performed by network application 120 or 125, or alternatively, access data from message store 130. The request is transmitted from telephone-based subscriber 165 through PSTN 155 to NIU 140. At NIU 140, the proper interface(s) (i.e. INT1, INT2, or INT3) may route the request to messaging platform 115 of host computer 110 running network applications 120 and 125. Similarly, requested processed data may be communicated back to telephone-based subscribers using this data path.

Figure 2:
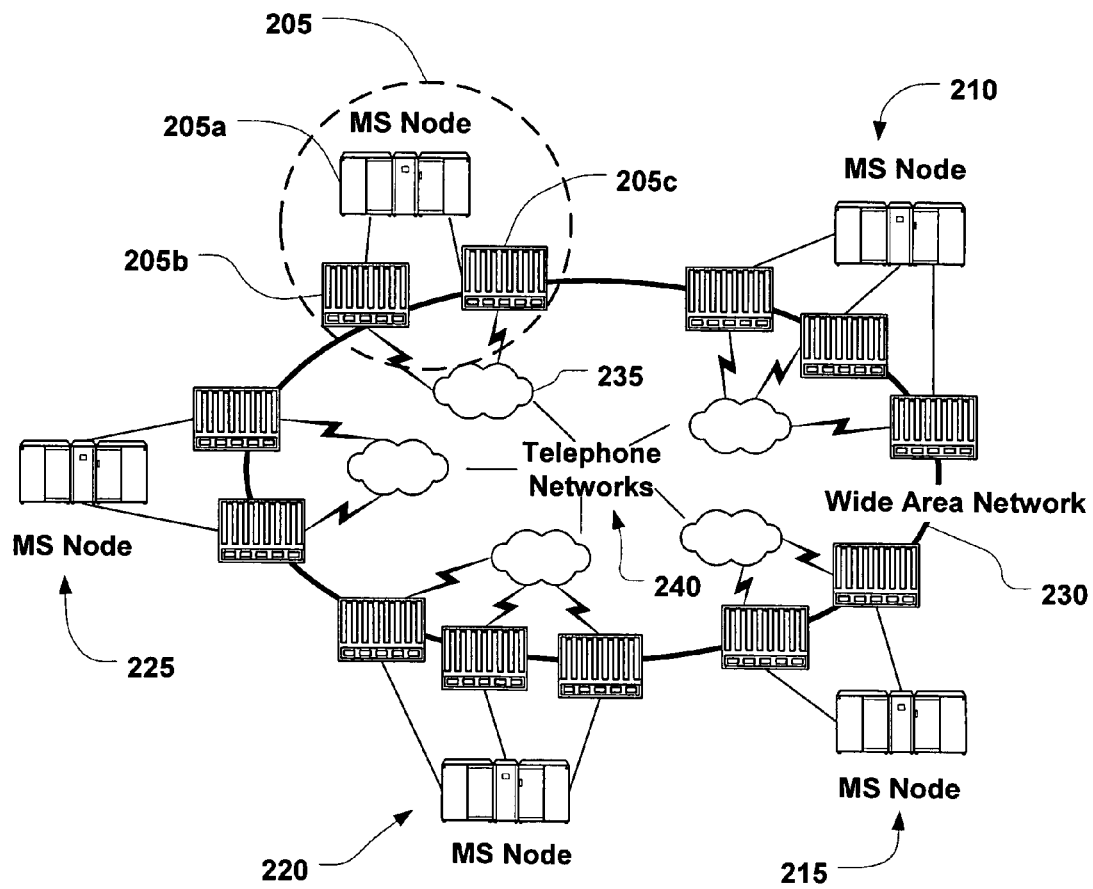
FIG. 2 is a system diagram of a distributed network applications platform in accordance with the present invention.

Distributed Messaging System:

FIG. 2 shows an exemplary distributed messaging system 200 in accordance with the present invention. As shown, distributed messaging system 200 comprises a plurality of messaging system nodes (MS Nodes) 205, 210, 215, 220, and 225, respectively, that are interconnected through wide area network (WAN) 230. As the circle around MS Node 205 indicates, MS Node may further comprise host computer 205a electronically coupled to network interface units (NIUs) 205b and 205c. In turn each of the NIU may be coupled to communication network 235 that is itself connected to telephone networks 240. In operation, a telephone based subscriber may connect to telephone networks 240 to request data from one of the MS Nodes 205, 210, 215, 220, or 225. The data is communicated through telephone networks to communication networks 235. From communication networks 235, the request may be communicated to a given NIU (e.g. 205b or 205c) where it is routed to the appropriate host, either a local host or to a remote host over the WAN 230.

Generally, distributed messaging system 200 allows each of the hosts (e.g. 205a) found on WAN 230 to interface with any of telephone networks 240. The desired MS Node may reside local or remote to the telephone networks. A local MS Node may comprise a MS Node that is local to the telephone network originating the telephone request. Comparatively, a remote MS Node may constitute a host computer that is geographically disparate to the telephone network that originated the data request. Distributed messaging system 200 provides a configuration whereby any host is afforded access and visibility (i.e. can monitor operations) to any of the NIUs that are connected to WAN 230 regardless of geographic position. As such, a host (e.g. 205a) may be loosely coupled (i.e. requires more than one hop) to remote NIUs and tightly coupled (i.e. requires one hop) to local NIUs.

Figure 3:
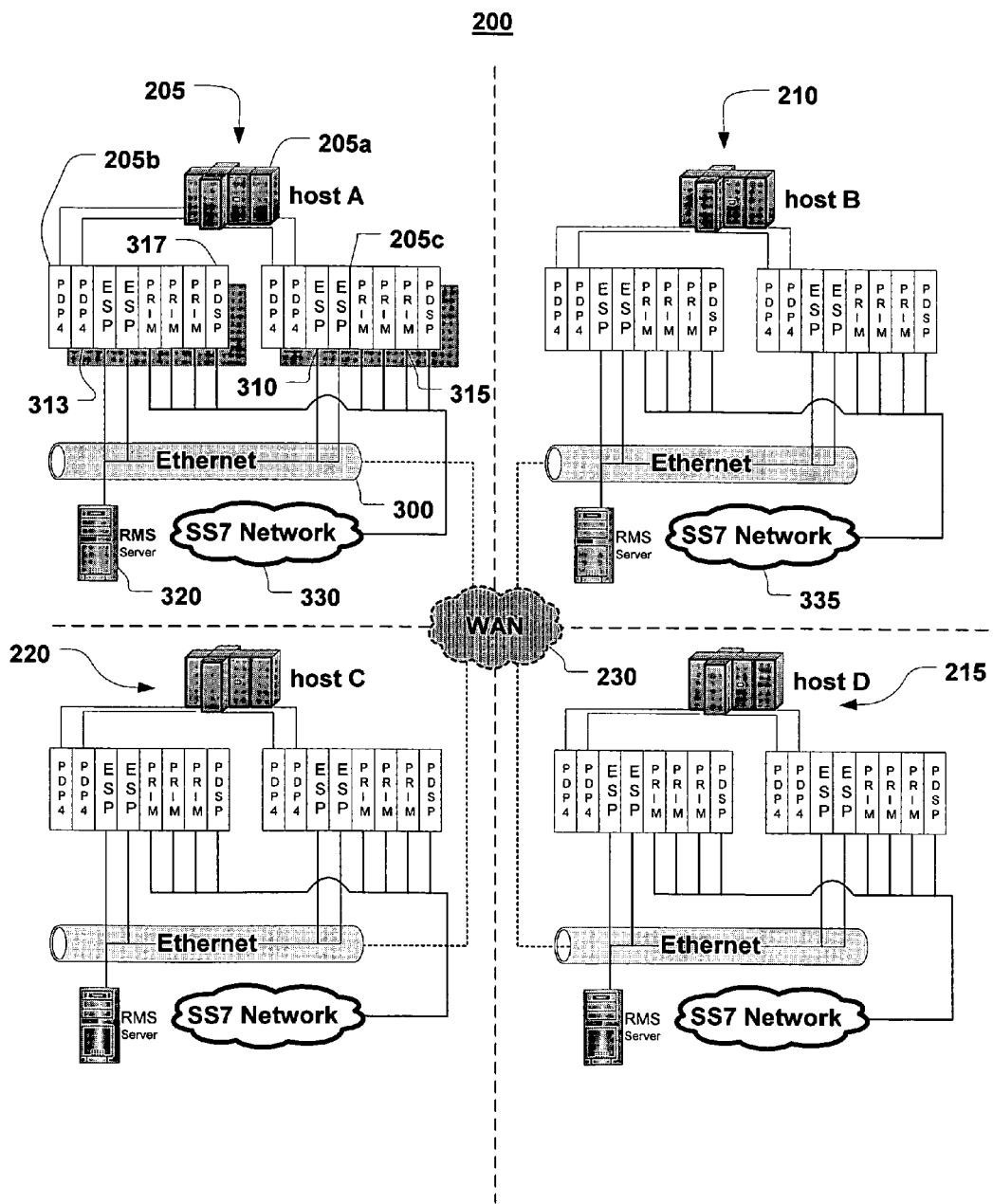
FIG. 3 is a detailed block diagram of the components employed by a distributed messaging system in accordance with the present invention.

FIG. 3 shows messaging system 200 (of FIG. 2) having four remote MS Nodes 205, 210, 215 and 220. FIG. 3 is divided into four quadrants where each quadrant represents a MS Node (i.e. a host computer 205a, corresponding NIUs 205b and 205c, and local telephone networks 330). As shown, the NIU (e.g. NIU 205b) may comprise a number of interface boards, such as, embedded services processor (ESP) 310, PDP 313, PRIM 315, and PDSP 317. These interface boards allow the NIU to communicate data from host computer 205a to local telephone network 330 and a remote maintenance server (RMS) 320. RMS 320 is used to provide a maintenance capability, including uploading software and modifications thereto to the ESPs 310. Within the NIU, these interface boards communicate with each other over an industry standard communication bus (not shown) (e.g. Multibus (1296) open bus standard) using industry standard communication bus messaging protocols and standards. Further details regarding the ESP can be found in U.S. patent application Ser. No. 09/636,656, filed herewith, entitled "Network Interface Unit Having Embedded Services Processor", which is hereby incorporated by reference in its entirety.

The intercommunication between each MS Node is achieved from inter-NIU communication realized through Internet Protocol (IP) (e.g. Ethernet connections 300) communications over WAN 230. Each NIU connects to WAN 230 via an Ethernet link (e.g. Ethernet 300). ESP 310, among other things, acts as a communication interface for the NIU providing an Ethernet connection to WAN 230. Accordingly, NIUs may communicate to each other using ESP boards such as ESP 310. Further, the configuration shown in FIG. 3 allows a host (e.g. host 205*a*-host A) to process a call from a remote telephony network (e.g. SS7 network 335—i.e. a call associated with a NIU at MS Node 210, 215, or 220). That is, a local telephone network connected to a local NIU may communicate to a local host by communicating data to the local NIU. In turn, the local NIU may route the data over the WAN 230 to a remote NIU for processing on a remote MS Node. Hence, signaling and voice traffic may be routed across WAN 230 from an NIU to any other NIU for processing by a desired MS Node.

Figure 4:
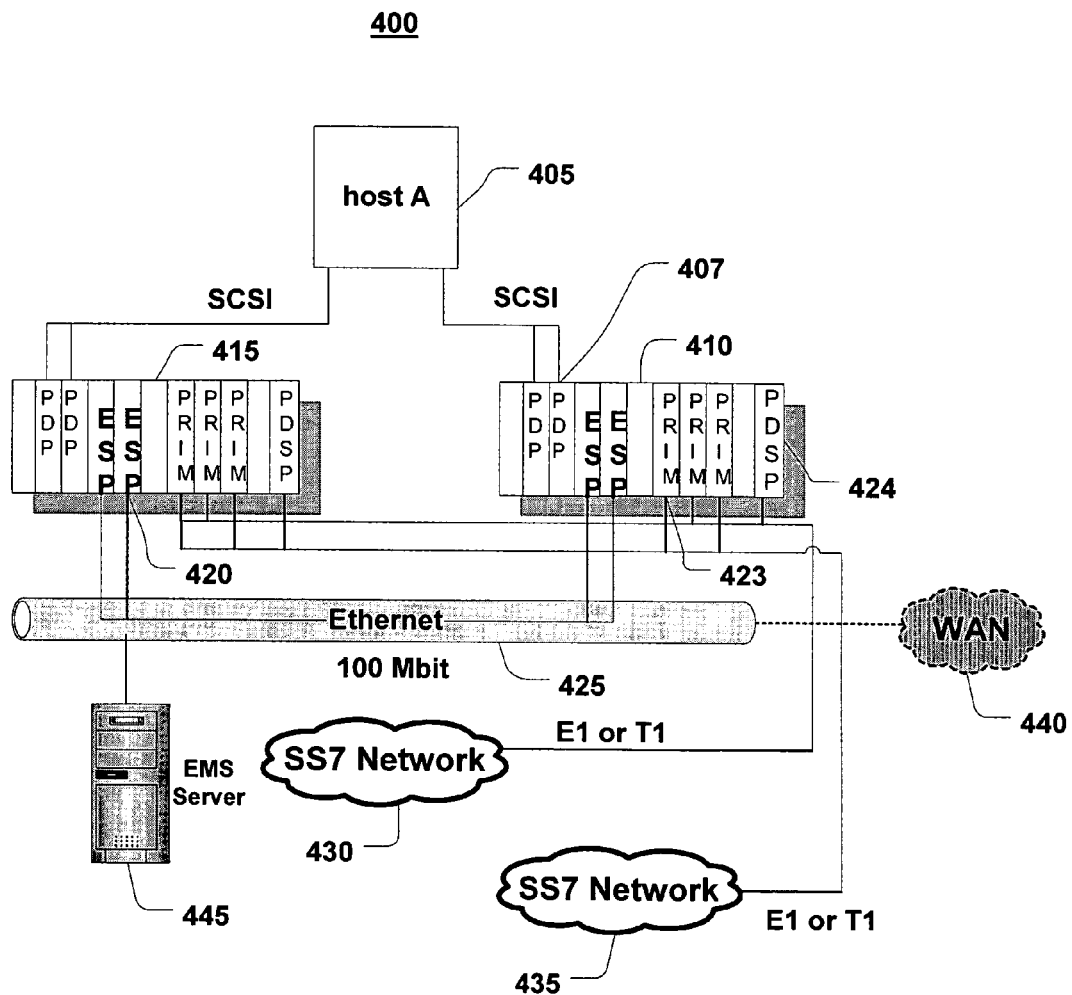
FIG. 4 is a detailed block diagram of the a distributed messaging system having an alternative configuration in accordance with the present invention.

FIG. 4 shows an alternative configuration for a MS Node. As shown, MS node 400 may comprise a single host computer 405 connected to multiple NIUs 410 and 415 through interface boards 407. In an illustrative implementation, host computer 405 may communicate with the NIU using the small computer systems interface (SCSI) communication protocol. NIUs 410 and 415 may support PDP interface boards that enable host computer to NIU communication. Further, NIUs 410 and 415 may comprise ESP boards (e.g. ESP 420) that enable data communication from NIUs 410 and 415 to RMS server 445 and to WAN 440 via Ethernet connection 425. Moreover, messaging system 400 allows communication of data from telephone networks 430 and 435 to host computer 405 through NIU interfaces 423. The connection between telephone networks (e.g. SS7 telephone networks) may be realized using E1 or T1 type telephony interfaces. Accordingly, in the configuration shown, host computer 405 is capable of cooperating with multiple local telephone networks and may cooperate with remote telephone networks, as well. In operation, data may be communicated from local host computer 405 to remote NIUs and subsequently to remote host computers, or telephone networks by communicating data to NIUs 410 and 415, that, in turn, pass the data to these remote entities through WAN 440.

In an illustrative implementation, each MS node of the messaging system 200 (or 400) may comprise the Network Applications Platform (NAP) described above and available from Unisys Corporation of Blue Bell, Pa. Each NIU of the messaging system 200 (or 400) may comprise the Unisys Telephony Services Processor (TSP).

Figure 5:
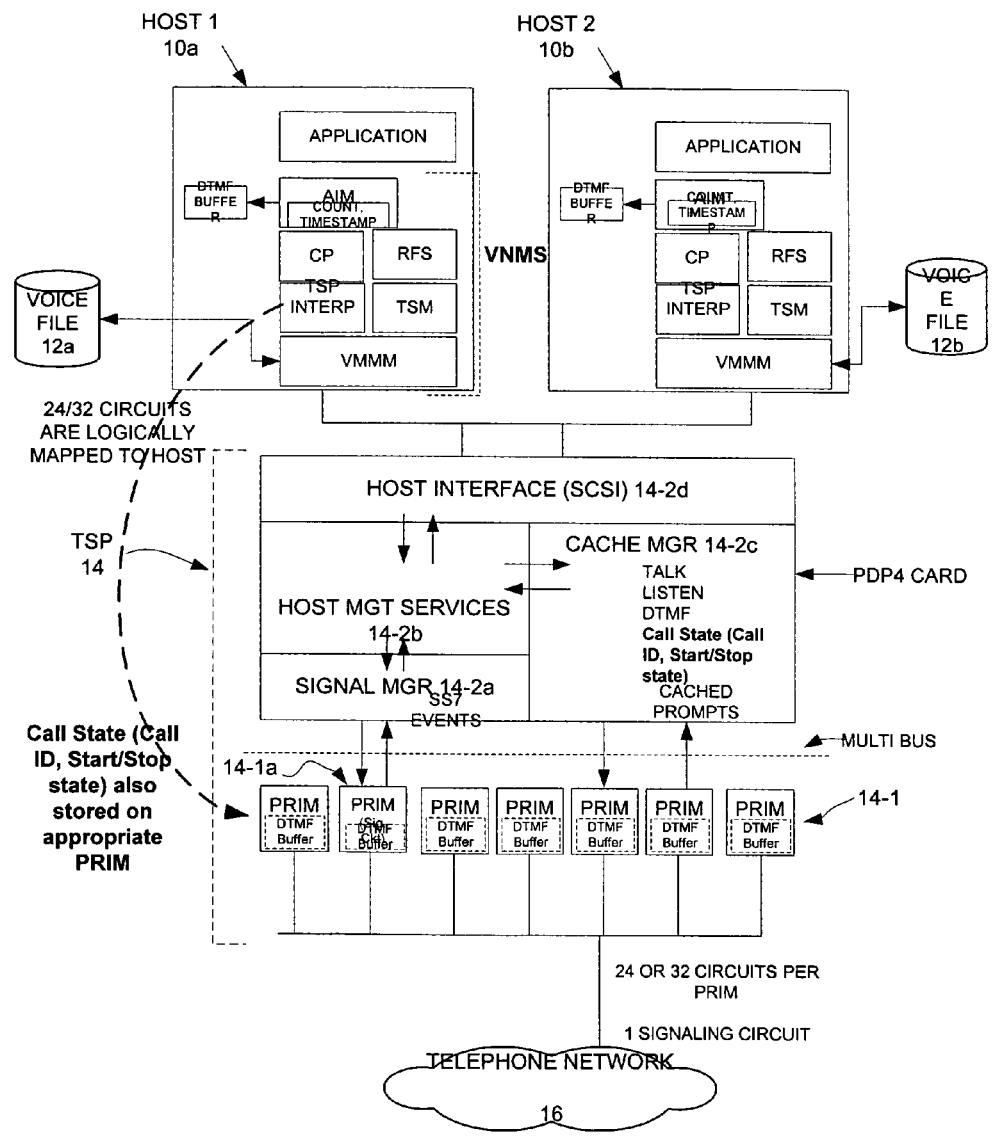
FIG. 5 is a block diagram of an exemplary messaging system showing the distributed network interface units (NIUs) cooperating in accordance with the present invention.

Exemplary TSP Architecture:

By way of background to describe an exemplary TSP and as shown in FIG. 5, each TSP 14 of the present invention comprises one or more Primary Rate Interface Modules (PRIMs) 14-1 and a PDP Card 14-2. The PRIMs 14-1 provide the interface between the TSP 14 and telephone networks, whereas the Packet Data Processor (PDP) 14-2 provides the interface between the TSP 14 and one or more NAP hosts 10*a*, 10*b*. Each PRIM 14-1 interfaces a set of (e.g., 24 or 32) telephone circuits to the PDP card 14-2. In addition, one PRIM 14-1*a* is dedicated to signaling, and communicates with the PDP Card's Signaling Manager 14-2*a*, which in turn communicates with a Host Management Services (HMS) module 14-2*b*. The HMS module 14-2*b* communicates with a Cache Manager 14-2*c* and a Host Interface module 14-2*d*. The overall function of the TSP 14 is to logically map a plurality of telephone circuits (e.g., 24 or 32 telephone circuits per PRIM) among the respective hosts. The processes performed by the PRIM(s) 14-1, Signaling Manager module 14-2*a*, Host Management Services module 14-2*b*, Cache Manager module 14-2*c* and Host Interface module 14-2*d* are explained below. Briefly, however, it should be noted that an SS7 packet received at a PRIM is routed to the Signaling Manager 14-2*a*, which is the SS7 User Part (SS7 level 4). The Signaling Manager converts the SS7 packet to a proprietary message that is ultimately received by a host. Before sending the message to a host, the HMS module 14-2*b* selects the appropriate host.

The components of the TSP 14 may be summarized as follows:

PRIM (Primary Rate Interface module) 14-1: The TSP PRIM module is used to send voice or receive voice from the network upon direction from the VNMS VMMM module (described below). It also is used to create hairpins (i.e., a connection of two voice ports to each other) upon direction from the VNMS TSP Interp Module.

Signaling Manager 14-2*a*: The Signaling Manager is used to communicate to the network using a country specific protocol such as SS7 or ISDN. It also communicates to the VNMS TSM module for circuit maintenance and the VNMS TSP Interp module for call control.

HMS (Host Management Services module) 14-2*b*: The TSP HMS module is used to centralize the TSP's handling of the shared TSP functionality. It insulates the rest of the TSP from the mechanics of switching calls from one host to another. It communicates to the VNMS TSP Interp module to transfer calls and the VNMS TSM module to configure the shared TSP environment. All TSP message traffic is routed through the HMS module.

CM (Cache Manager) 14-2*c*: The TSP CM module is used to provide a high speed buffering of commonly used voice messages to reduce demand on the VNMS VMMM module. The CM module also enforces voice message protocols for voice traffic directed to the PRIMs.

HIP (Host Interface Processor) 14-2*d*: The HIP board is used to communicate to the host operating system using a SCSI bus to transfer and receive buffers of data between the VNMS and TSP. It enforces the protocol on the TSP to collect messages in an efficient manner to transmit to the host and similarly breaks apart buffers from the host into messages that can be processed by other TSP modules.

In this exemplary embodiment of the system, the host computers 10*a* and 10*b* each include the following modules (not all of which are shown in FIG. 5):

VNMS (Voice Network Management System (VNMS)): The host-based software that routes incoming calls to the appropriate applications, routes outgoing calls to the appropriate ports, manages the recording and transmission of voice message, and tracks information about each call. A partial set of the VNMS modules include the Application Interface Module (AIM), the Voice Message Management Module (VMMM), the TSP Signaling Manager (TSM), the Remote Files System (RFS), and the TSP Interpreter (TSP Interp).

VMMM (Voice Message Management Module for TSP): The VNMS VMMM module handles the telephony media data, such as voice prompts, voice messages, fax messages and Speech Recognition vocabularies that are passed back and forth between VNMS and the TSP. The media data is stored in a file on disk. This file, called the voicefile, is simply a disk file used for media data. Pointers to the media data are maintained in a database called the Voice Input/Output database (VIODB). All activities performed by VMMM are directed by the VNMS AIM module according to the commands sent by network applications. The TSP CM module caches frequently used media message segments; VMMM does not have to pass media data to the TSP for every application send message command. The VMMM also communicates to the host operating system using a SCSI bus to send and receive buffers of messages to and from the TSP HIP module.

TSP Interp (TSP Interpreter): The VNMS TSP Interp module interprets signaling and event TSP messages using VNMS control and data structures. TSP signaling messages include the initiation, transfer and termination of calls. TSP event operations include incoming DTMF digit messages, purging and retrieving DTMF. TSP Interp uses a data structure called the call record to keep the attributes of a call. It will communicate to the VNMS CP module to handle application responses or requests. It will communicate to the VNMS VMMM module as appropriate to communicate to the TSP.

CP (Call Processing Module): The VNMS CP module provides the interface for call processing configuration. It receives requests from the TSP Interp or AIM module and sends requests to the TSP Interp or AIM module. The CP module uses the call record data structure and NDMDB database to decide how to permute digit fields, define application call types and other administrator defined functions.

NDMDB (Network Data Model Database): The VNMS NDMDB contains the administration defined configuration. During initialization the NDMDB is loaded into a set of memory data structures called turbo arrays. The turbo arrays are used to retrieve information during call processing.

TSM (TSP Signaling Manager): The VNMS TSM module is used to accept all messages from the TSP that are not telephony media related. TSM distributes all signaling and event messages to the TSP Interp, all remote file system commands to the RFS module and processes all circuit maintenance operations itself. Circuit maintenance operations handle the suspending and resuming network circuits.

AIM (Application Interface Module): The VNMS AIM module translates high level application commands from each application to functions specific to each of the other modules in NAP such as VMMM and CP. It also translates VNMS function calls from the lower layers of VNMS to application responses. AIM interfaces with one or more network applications (NAs) through standard host interfaces. For example, the Send Message command plays a message, optionally records a message, and collects DTMF digits. AIM reports results of command execution back to the application by way of response. These commands and responses carry with them unique dialog Ids, assigned by AIM, that associate them with a call.

RFS (VNMS Remote File System): The VNMS RFS module is a service module for the TSP and acts as a file server for TSP data, such as tracing and configuration definitions. The RFS module is required during TSP initialization for the TSP to obtain all its code and initial data value.

Thus, as shown, each TSP is connected to certain "ports" of the telephone network. A call coming into a given port is received by the TSP connected to that port. Specifically, a call comes into a PRIM board in the TSP, and the Signaling Manager on the PDP card of that TSP routes the call to the Host Management Services (HMS) module 14-2b (see FIG. 5). The call comes in on a reserved signaling channel 14-1a of the PRIM and is immediately transferred to the Signaling Manager 14-2a on the PDP board. The signaling manager reformats the call packet and gives it to the HMS module 14-2b, which in turn gives it to the Host Interface Module 14-2d. The Host Interface Module 14-2d places the call on the SCSI bus. The VNMS VMMM module takes the call from the SCSI bus and submits it to the TSP Interp module (via the TSM), which creates the call record. The TSP Interp module gives the call to the CP module that sits between the AIM and TSP Interp, which interrogates the database information in memory, to obtain the necessary information (via digit fields supplied from the network) to route the call to the proper application. The CP module then queues the call to the application interface module (AIM). The AIM dequeues the call and gives it to the specified application.

Each new incoming call is assigned a TSP identifier, a PRIM identifier, and a channel identifier. The HMS module 14-2b uses a routing algorithm to route the new call to one of the hosts. For example, a simple round-robin algorithm may be used. If a subsequent call comes in with the same TSP, PRIM, and channel identifiers, it is routed to the host that last processed a call for this same TSP, PRIM, and channel instance. Once the TSP has routed a call to a particular host, it assumes that the host is handling the call.

When the VNMS on a host receives an incoming call from a TSP 14, a determination is made as to whether that host and/or application can process the call. For example, the VNMS may perform call-type mapping to determine if the application running on it is capable of processing the call. If so, it passes the call to the application for handling. The application itself can also determine whether to process a given incoming call. If either the VNMS or the application determines that the call cannot be processed on the host, a request can be issued to the TSP to transfer the call to another host. The Inter-System Call Transfer process is described in U.S. patent application Ser. No. 09/307,014, filed May 7, 1999, "Inter-System Call Transfer." Specifically, call information is transferred between cooperating TSPs of DNAP system using a call profile standard. The call profile standard provides control type messages to cooperating TSPs that indicates various call states. The call profile standard is used to communicate call data including call voice data, call DTMF data, and call signaling data.

Distributed Messaging System (Continued)

Figure 6:
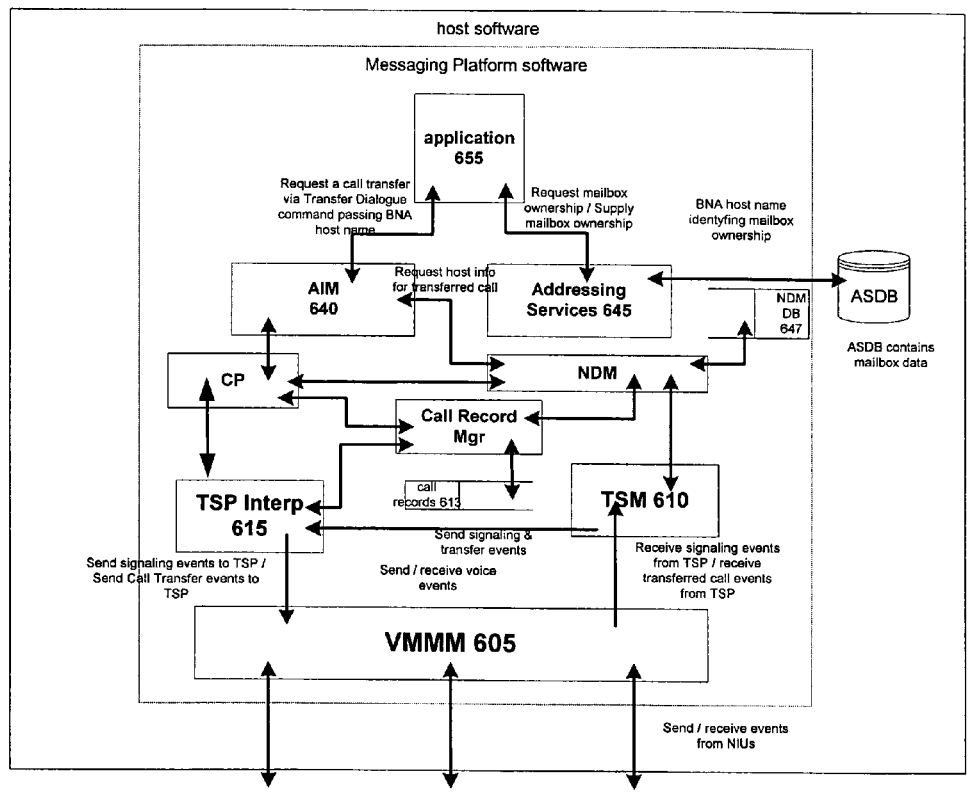
FIG. 6 is a block diagram of the software architecture employed to allow distributed messaging in accordance with the present invention.

Referring to FIG. 6, messaging system 200 utilizes the NAP and TSP system components described above to properly access required data as requested by a telephone subscriber. For example, a telephone subscriber travelling away from their home telephone network may want to access their voice mail by dialing a local telephone network. The arrows indicate the flow of data between the cooperating components of messaging system 200. Upon receipt of the call initiate event at the host (i.e. Send/Receive events from cooperating TSPs), VMMM 605 forwards the event to TSM 610 and TSM 610 forwards the event to TSP Interp 615. In turn, TSP Interp 615 will: 1) construct a call record for the incoming call, 2) retrieve the application ID from the call type mapping table found in the NDMDB 647, 3) retrieve the host ID from the application ID, and 4) forward the new call to the AIM 640 if the application resides on this host or send a request to the signaling TSP to transfer the call to another host if the application is not present on the local host or is not responding. In turn, AIM 640 announces the new call to the NAP 655 application. The application 655 may either accept the call immediately of determine if the voice-mailbox for this call resides on the host processing the call. In either case, the application 655 invokes an Addressing Service 645 to provide the host that owns the desired mailbox. If the host is remote, the application will request the call to be transferred to the appropriate host.

When the call is transferred, the AIM 640 forwards the request to the TSP Interp 615 to construct a Transfer Port Message that includes the call record, and network data to the local signaling TSP. The call is then transferred to the appropriate host with this message in tow for processing by the identified host. After a call is transferred to a different host, VNMS components on the host that transferred the call will no longer maintain call information for the transferred call.

The distributed NAP (DNAP) configuration provides a different level of TSP awareness for the VNMS. Some of the TSPs that service calls may be remote rendering conventional methods of handling different events as inadequate; in particular, selecting a local TSP for a message that is destined for a remote TSP. With DNAP, there exists a TSP whose purpose is to route messages/data to TSPs located at remote NAP nodes. This TSP is referred to as a proxy TSP. The proxy TSP is realized as a software module residing in the TSP that maintains logic, rules, and instructions to handle the routing of data between interconnected TSPs.

Figure 7:
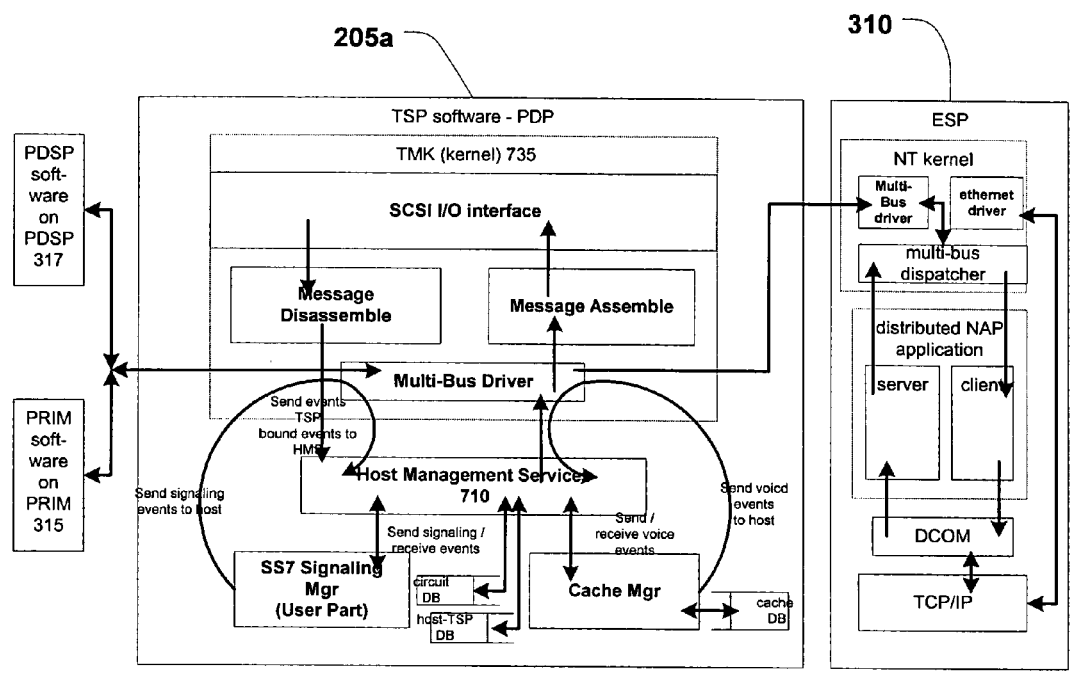
FIG. 7 is a block diagram of the software architecture present in a network interface unit (NIU) of a distributed messaging system in accordance with the present invention.

FIG. 7 shows the flow of events between the software modules of the TSP when processing an incoming call. The arrows indicate data paths between cooperating components of a NAP TSP. Upon receipt of TSP-bound events, the I/O interface passes a message packet to the message disassembly module. The message packet typically contains a set of messages of the same operation class. The message disassembly module unbundles the messages and sends each message to Host Management Service (HMS) 710. HMS 710 analyzes each message individually and processes each message according to HMS criteria. For call related messages, HMS 710 maintains call state for the target voice channel based on the event. For telephone network circuit maintenance messages, HMS 710 maintains circuit state and notifies other hosts when circuit states are changed. For HMS events, HMS 710 maintains the affected component's state and broadcasts similar messages to all hosts. For non-HMS messages, HMS 710 forwards them to their target destinations, e.g., the signaling manager, the cache manager, the cooperating PRIM.

All host-bound events are routed through HMS 710 before being sent to the message assembly module which bundles events by operation class for host consumption. HMS 710 analyzes each message individually and processes each message according to HMS criteria. For call related messages, HMS 710 maintains call state and provides the identification of the destination host. For circuit maintenance messages, HMS 710 broadcasts the circuit maintenance event to all hosts.

The distributed NAP architecture will utilize the distributed TSP architecture described above and utilizes the HMS in a similar manner. In addition to the services noted above, HMS 710 provides the following services in the distributed NAP architecture, 1) determining the primary (or preferred) path between a TSP and all remote TSPs, 2) Determining when a message is targeted for a remote node (i.e. the target destination is either a remote host or a remote TSP), 3) Selecting the preferred path between the local TSP and the remote TSP, 4) selecting the ESP on the local TSP that is involved in the path (or route) between the local TSP and the remote TSP when a call related message is targeted for a remote host or a remote TSP, 5) sending messages targeted for a remote TSP or remote host to the distributed NAP application residing within the selected ESP, 6) receiving remote messages from an ESP and routing the message to the appropriate local component, host or TSP module, 7) switching to a back-up route when the primary route is unavailable (due to ESP board failure at either end or TSP software failure), and 8) synchronizing the primary and back-up routes with the local ESP(s).

Figure 8:
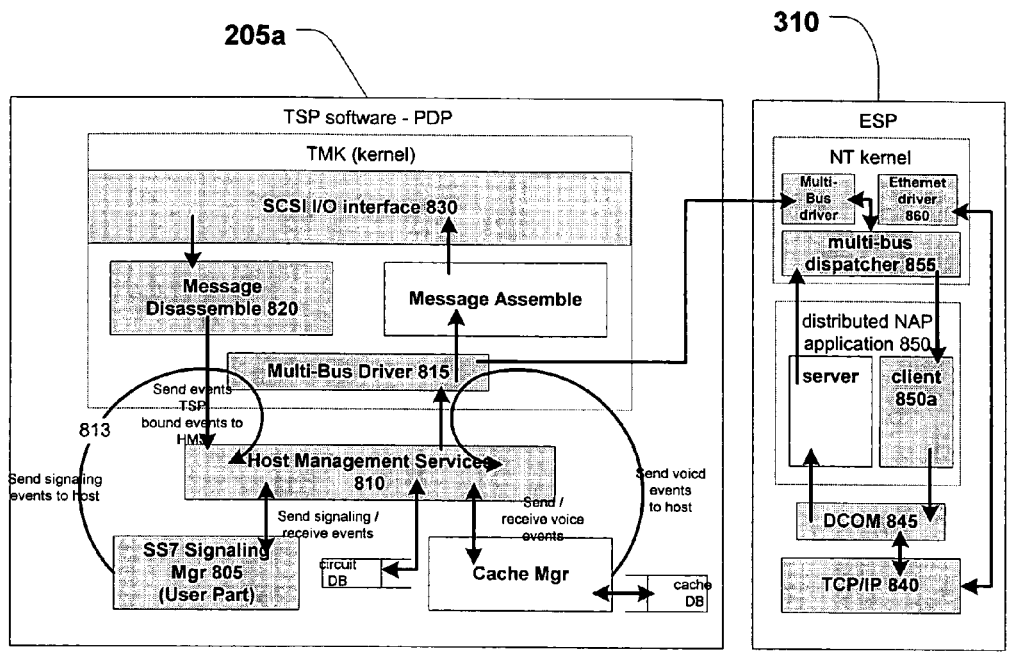
FIG. 8 is a detailed block diagram of FIG. 7.

FIG. 8 shows the software components that are involved when a call is transferred to another host, in particular a remote host using a TSP of the preferred embodiment. The arrows indicate the data flow between cooperating TSP components. As shown in FIG. 8, the components that are involved in call transfer are shaded. Generally, the TSP will receive from the local host a request to transfer a call, via a Transfer Port message. The message is forwarded to the HMS 810 module through the Message Disassemble 820 module. In turn, HMS 810 will select the preferred routing path (i.e. the local ESP, or a remote proxy TSP and the ESP board within the remote TSP) for the remote host specified in the message. The routing path to the remote host identifies a point to point connection between an ESP on the local TSP and an ESP on the proxy TSP at the remote site. To select this routing path, the HMS 810 may: 1) select a preferred ESP in the local TSP for sending the Transfer Port message across the DNAP WAN (i.e. in the event that there may be more than one ESP at the local TSP), 2) select the preferred remote TSP and ESP and save it in the message, and send the Transfer Port message to the local ESP via the Multibus (1296) open bus standard (as described above). HMS cooperates with the host computer of the messaging system using SCSI I/O Interface 830 to process the routing decision.

In operation a message passes from SS7 Signaling Manager 805 to HMS 810. This task is accomplished by direct communication from the SS7 Signaling Manager 805 to HMS, or alternatively, by using Multibus (1296) open bus standard Driver 815 as indicated by data flow arrow 813. As described, as part of processing, the message is communicated to ESP 310 by using Multibus (1296) open bus standard driver 815. In turn, the ESP employs Multi-bus dispatcher 855 to communicate the message to the client portion 850a of distributed NAP application 850. Client 850a is used to communicate the data for transfer to other cooperating TSPs of the DNAP system using DCOM 845 and TCP/IP stack 840. As shown, TCP/IP stack 840 cooperates with Ethernet driver 860 to communicate data other TSPs.

Figure 9:
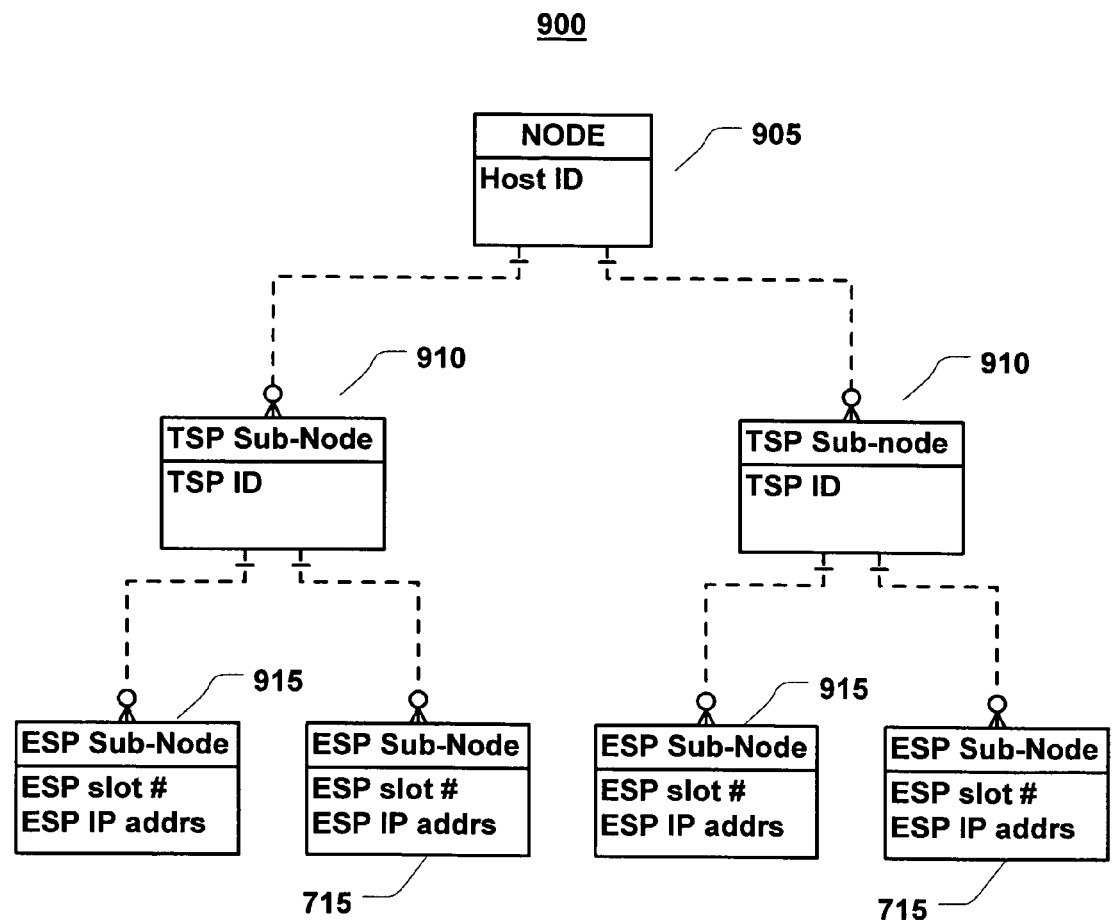
FIG. 9 is a block diagram of the addressing scheme contemplated by a distributed messaging system in accordance with the present invention.

FIG. 9 shows the configuration information established for each of the MS Nodes of messaging system 200. Each MS Node configuration is identified as a group of components that includes a host ID, the TSP Ids, and IP addresses and computer names of each ESP board. As shown, MS Node configuration 900 comprises several levels. Level one 910 illustrates the information stored about the host. Level one 910 information includes the "Host ID." Level two 915 describes information stored about the cooperating TSPs (i.e. NIUs). Included in level two 915 information is the "TSP ID." Lastly, level three 920 offers information about cooperating ESPs. Level three 920 information includes "ESP slot #" and "ESP IP address" and "ESP Computer Name." It is important for VNMS and TSP software to understand the relationships between the hosts and the TSPs (and ESPs) configured in the distributed messaging system so that the appropriate routing paths are established when communicating with a remote component.

Figure 10:
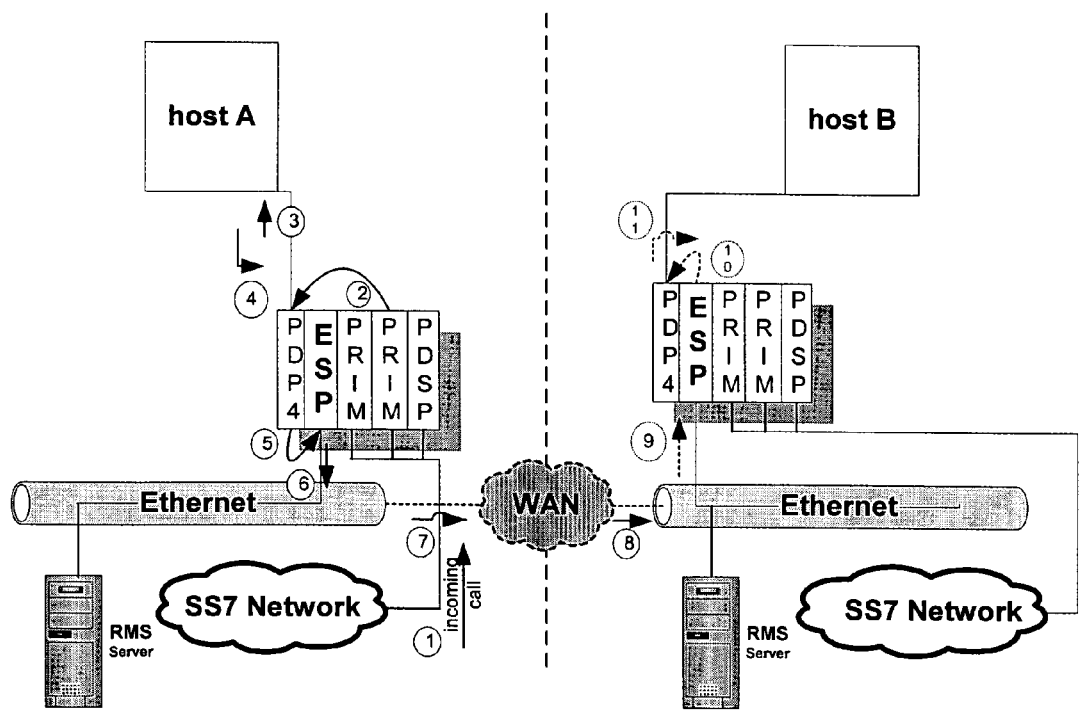
FIGS. 10–11 are block diagrams showing the cooperation between components of a distributed messaging system when processing a request of data from a remote messaging system node in accordance with the present invention.

FIG. 10 describes the processing of data by the various components of a distributed message system when processing an incoming call that is received by a first messaging system (e.g. NAP A) and transferred to a second messaging system (e.g. NAP B). The data flow is indicated by arrows having numbers that correspond to the processing order. Step 1 indicates that a call has arrive at NAP A. The signaling event associated with the call initiate request is received by the signaling link associated with the SS7 network for NAP A. At step 2, the call initiate signaling event is routed to the signaling manager on the PDP NIU interface board. From there, at step 3, the signaling manager sends the call initiate request to host A and host A answers the call. The VNMS on host A then routes the call to the application layer at step 4. The application layer determines that the call should be routed to the host on NAP B (i.e. host B). In response to the messaging application's request, VNMS notifies the TSP and requests the TSP to transfer the call to host B. When the call is transferred, all of the data associated with the call is transferred to the new host (including dual-tone multi-frequency (DTMF) that had been collected prior to the transfer). At step 5, upon the receipt of the transfer request, the TSP (i.e. the HMS software component located on the PDP interface board) recognizes that the new destination host is a remote host and routes the call packet to the distributed NAP client application on the ESP board. At step 6, the distributed NAP client application sends the call packet over the TCP/IP interface to a remote TSP at NAP B. The call packet is then routed over the WAN to the destination node at step 7. The call packet arrives at the remote location at step 8. The call packet is then routed to the ESP node specified by NAP A at step 9. From there, the distributed NAP server application, upon receipt of the call packet, sends the packet to the PDP NIU interface board at step 10. At step 11, the call packet is routed to host B via the SCSI interface connection. At this point in the call flow, host B receives the call packet and VNMS notifies the application and the application accepts the call. Data can be passed between the TSP on NAP A and the application on host B.

Figure 11:
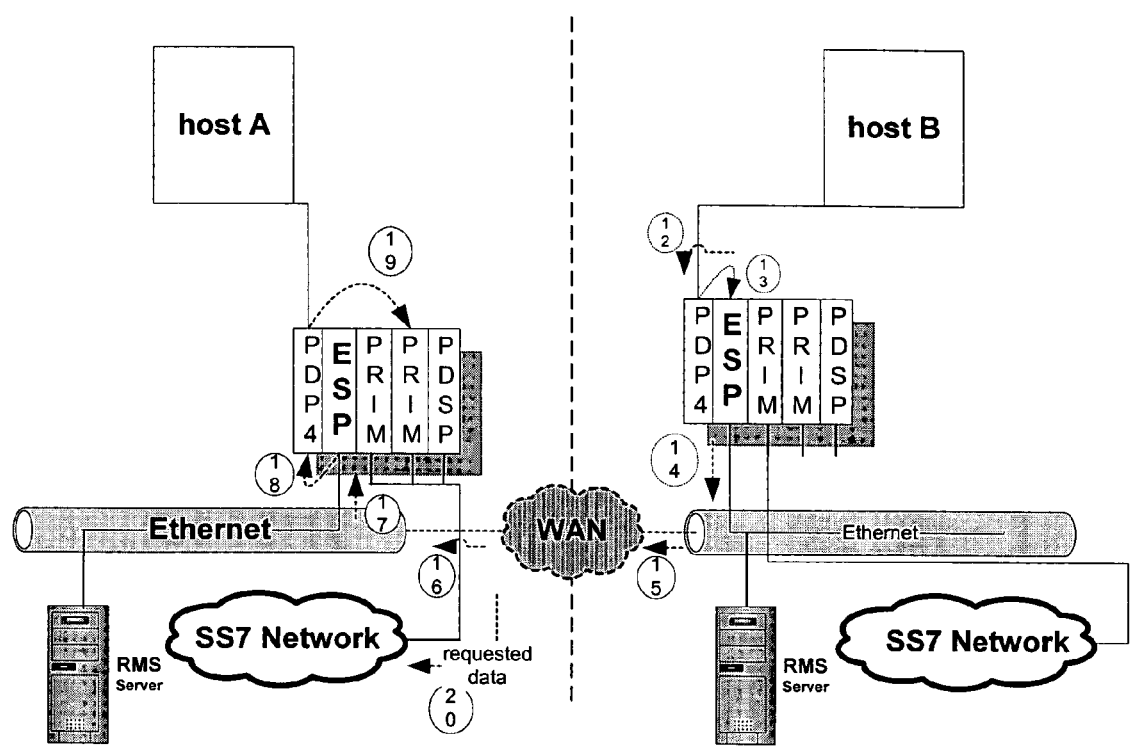

FIG. 11 describes the call flow detail after a call has been answered and transferred to a remote host, host B. As shown, requested data is transferred from host B to HMS on the cooperating PDP board at step 12. From the PDP NIU interface board, the data is passed to the ESP at step 13 for communication over the distributed messaging system WAN. The ESP passes the requested data to the Ethernet interface at step 14 for communication to WAN at step 15. The WAN delivers the data packet to the originating MS Node at step 16. From there, at step 17, the packet data is communicated to HMS on the PDP via an Ethernet interface with the originating MS Node ESP at step 17. The data is then transferred to the telephone network (SS7 Network) interface PRIM through steps 18 and 19. The PRIM delivers the requested data to the requesting telephone subscriber at step 20. As such a telephone subscriber may receive requested data from a remote host through local access.

In sum, the present invention provides a system and methods that allow messaging systems to provide local access to data residing on a remote messaging system computing device. It is understood, however, that the invention is susceptible to various modifications and alternative constructions. There is no intention to limit the invention to the specific constructions, such as, the exemplary messaging system architectures described herein.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although exemplary embodiments of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention as defined in the following claims

What is claimed is:

1. A distributed voice messaging system comprising:
a first voice messaging platform having a database of subscribers to a voice messaging application executing on said first voice messaging platform, each subscriber of said first voice messaging platform having an associated voice mailbox on said first voice messaging platform;
a first network interface unit that provides an interface between the first voice messaging platform and a telephone network;
a second voice messaging platform having a database of subscribers to a voice messaging application executing on said second voice messaging platform, each subscriber of said second voice messaging platform having an associated voice mailbox on said second voice messaging platform;
a second network interface unit that provides an interface between the second voice messaging platform and the telephone network; and
a parallel access wide area network connection between said first and second network interface units, wherein signaling and voice data of a call received from said telephone network by said first network interface unit can be transferred in real time to said second network interface unit via said parallel access wide area network connection between them for processing by said second voice messaging platform instead of said first voice messaging platform.

2. The distributed voice messaging system recited in claim 1, wherein said first
voice messaging platform and first network interface unit are geographically separated from said second voice messaging platform and second network interface unit, and wherein said network connection comprises a wide area network (WAN) that supports IP protocol communications.

3. The distributed voice messaging system recited in claim 1, wherein said first and second network interface units each comprise a first interface to their respective voice messaging platforms for communicating therewith and a second interface to the telephone network for receiving and handling calls there from, each network interface unit further comprising an embedded services processor (ESP) module in communication with both said first and second interfaces, said ESP module comprising a processor, a memory, an operating system executing on said processor and a network interface that supports an IP communication protocol, wherein said network connection is established between the network interfaces of said ESP modules of said first and second network interface units.

4. The distributed voice messaging system recited in claim 3, further comprising
program code that executes on the processor of the ESP module of each network interface unit under the control of its respective operating system and that facilitates the transfer of signaling and voice data from one network interface to the other via said network connection.

5. The distributed voice messaging system recited in claim 4, wherein said ESP module is capable of communicating data between components of said first and said second network interface units.

6. The distributed voice messaging system recited in claim 5, wherein said ESP module communicates data between said components of said network interface units using a Multibus (1296) open bus standard.

7. The distributed voice messaging system recited in claim 1, further comprising one
or more additional voice messaging platforms and associated network interface units, wherein all of said network interface units are connected by said network connection and wherein the signaling and voice data of a call received from the telephone network by any one of the network interface units can be transferred to any other network interface unit via said network connection.

8. In a voice messaging system comprising a first voice messaging platform and a
first network interface unit that provides an interface between the first voice messaging platform and a telephone network, and a second voice messaging platform and a second network interface unit that provides an interface between the second voice messaging platform and the telephone network, a method comprising the steps of:
(a) receiving a call from the telephone network by the first network interface unit and passing information about the call to the first voice messaging platform for processing thereon;
(b) determining by said first voice messaging platform that the call is intended for a subscriber that has a voice mailbox on said second voice messaging platform;
(c) instructing said first network interface unit to transfer signaling and voice traffic associated with the call to said second network interface unit via a separate parallel access wide area network connection between them; and
(d) processing the call on said second voice messaging platform, wherein the signaling and voice data for the call continues to be received by said first network interface unit and transferred to said second network interface unit via said network connection between them.

9. The method recited in claim 8, wherein said receiving step comprises accepting a call from telephone networks electronically coupled to said first network interface unit through a telephone network interface.

10. The method recited in claim 8, where said determining step comprises communicating data about said call from said first network interface unit to a first host computer through a host-to-NIU interface, said host computer processing data indicative of said first call to determine if said call is to be transferred.

11. The method recited in claim 8, wherein said instructing step comprises communicating data from said host-to-NIU interface to a NIU-to-external networks interface by said first network interface unit.

12. The method recited in claim 11, wherein said instructing step further comprises determining an optimal communication path between said first network interface unit and said second interface unit.

13. The method recited in claim 8, wherein said processing step comprises communicating data from said NIU-to-external communication interface of said first network interface unit to a NIU-to-external communication interface of said network interface unit.

14. A method of providing value added services to subscribers of voice messaging systems comprising:
providing a distributed voice messaging system as recited in claim 1;
creating messaging plans to capitalize on the distributed capabilities of said voice messaging systems, said created messaging plans indicative of a variety of value added services; and
offering said messaging plans to subscribers of said messaging systems.

15. The method recited in claim 14, wherein said messaging plans comprise a plan that allows said subscribers to access their voice messages located on a remote voice messaging platform by communicating with a local voice messaging platform.

16. The method recited in claim 14, wherein said messaging plans comprise a plan that allows said subscribers to consolidate voice message accounts such that a plurality of voice message accounts located on disparate voice messaging platforms of a distributed voice messaging system may be accessed through a single point of access by said subscriber.

* * * * *